(12) United States Patent
Nakanishi et al.

(10) Patent No.: US 8,720,268 B2
(45) Date of Patent: May 13, 2014

(54) FLOW RATE DETECTION DEVICE HAVING ANTI-UNDERCURRENT MATERIAL

(75) Inventors: Taiki Nakanishi, Chiyoda-ku (JP); Hiromoto Inoue, Chiyoda-ku (JP); Yoshitatsu Kawama, Chiyoda-ku (JP)

(73) Assignee: Mitsubishi Electric Corporation, Tokyo (JP)

( * ) Notice: Subject to any disclaimer, the term of this patent is extended or adjusted under 35 U.S.C. 154(b) by 410 days.

(21) Appl. No.: 13/070,131

(22) Filed: Mar. 23, 2011

(65) Prior Publication Data

US 2012/0103087 A1 May 3, 2012

(30) Foreign Application Priority Data

Oct. 29, 2010 (JP) .................................. 2010-244024

(51) Int. Cl.
*G01F 1/68* (2006.01)

(52) U.S. Cl.
USPC ...................................................... 73/204.26

(58) Field of Classification Search
None
See application file for complete search history.

(56) References Cited

U.S. PATENT DOCUMENTS

| | | | | |
|---|---|---|---|---|
| 5,473,503 A * | 12/1995 | Sakata et al. | .................. | 361/525 |
| 6,007,668 A * | 12/1999 | Kodani et al. | .................. | 156/295 |
| 6,470,743 B2 * | 10/2002 | Yonezawa et al. | ......... | 73/204.26 |
| 6,611,616 B1 * | 8/2003 | Van et al. | ....................... | 382/145 |
| 6,809,268 B2 * | 10/2004 | Hayashi et al. | ............... | 174/260 |
| 2002/0106833 A1 * | 8/2002 | Kobayashi | .................... | 438/108 |
| 2007/0018309 A1 * | 1/2007 | Chang et al. | .................. | 257/704 |
| 2009/0199632 A1 * | 8/2009 | Toyoda | ....................... | 73/204.26 |
| 2010/0313651 A1 * | 12/2010 | Hidaka et al. | ............... | 73/204.26 |

FOREIGN PATENT DOCUMENTS

| | | | | |
|---|---|---|---|---|
| JP | 9-26343 | A | | 1/1997 |
| JP | 2000-2573 | A | | 1/2000 |
| JP | 2000-258607 | A | | 9/2000 |
| JP | 2001-12986 | A | | 1/2001 |
| JP | 2001-508879 | A | | 7/2001 |
| JP | 2002-129754 | A | | 5/2002 |
| JP | 2006-019341 | | * | 1/2006 ............... H05K 3/46 |
| JP | 2006-076194 | A | | 3/2006 |
| JP | 2009-008619 | A | | 1/2009 |
| JP | 2009-147059 | A | | 7/2009 |
| JP | 2010-161310 | A | | 7/2010 |
| JP | 2010-177264 | A | | 8/2010 |

OTHER PUBLICATIONS

Japanese Office Action, dated Oct. 16, 2012, issued in corresponding Japanese Application No. 2010-244024.

\* cited by examiner

*Primary Examiner* — Harshad R Patel
(74) *Attorney, Agent, or Firm* — Sughrue Mion, PLLC

(57) ABSTRACT

The flow rate detection device includes a sensor element and a support. The sensor element includes: a cavity which is formed in a rear surface of a plate-shaped semiconductor silicon substrate by removing part of the plate-shaped semiconductor silicon substrate; and a thin film portion which is disposed over the cavity and includes a detecting element. The support includes a fitting portion into which the sensor element is to be disposed. The sensor element is supported to the fitting portion by an adhesive in a floating manner. A gap formed between the sensor element and the fitting portion is filled with an anti-undercurrent material. The sensor element has a texture including protrusions and depressions formed on a surface opposed to the fitting portion, and the anti-undercurrent material is brought into contact with the texture.

8 Claims, 15 Drawing Sheets

FLOW RATE DETECTION DEVICE HAVING ANTI-UNDERCURRENT MATERIAL

BACKGROUND OF THE INVENTION

1. Field of the Invention

The present invention relates to a flow rate detection device for measuring the volume of air.

2. Description of the Related Art

Until now, as a device for measuring the volume of air in an internal combustion engine, for example, there has been known a flow rate detection device employing an inflow temperature-dependent resistor. The flow rate detection device is provided with a sensor element including a heating element and an intake air temperature detector. The sensor element is kept under control so that a temperature of the heating element is higher than a temperature detected by the intake air temperature detector by a given amount, so as to detect a voltage corresponding to an amount of heat that the heating element dissipates into a fluid, to thereby detect a flow rate of the fluid finally.

Japanese Patent Application Laid-open No. 09-026343 discloses an example of a support structure for the sensor element used in such a flow rate detection device. The sensor element disclosed in Japanese Patent Application Laid-open No. 09-026343 includes a cavity, which is formed in a rear surface of a plate-shaped semiconductor silicon substrate by removing part of the substrate, and a thin film portion, which is disposed over the cavity and includes a detecting element. The sensor element is bonded to a support fitting portion only on one side, that is, the sensor element is supported in a cantilever manner.

In the flow rate detection device having the cantilever support structure as disclosed in Japanese Patent Application Laid-open No. 09-026343, a fluid to be measured flows only on a front surface of the sensor element in a low flow rate range, whereas in a high flow rate range, the fluid to be measured flows into a gap between the sensor element and the support fitting portion as well (hereinafter, this flow is referred to as "undercurrent"), which leads to a problem of reduced accuracy in flow rate detection. In order to solve the problem, in Japanese Patent Application Laid-open No. 09-026343, a groove-shaped slot is provided in the support fitting portion along the periphery of the sensor element so that the undercurrent, which occurs in the high flow rate range, may be prevented from directly contacting the sensor element.

However, when the fluid to be measured is guided into the slot, part of the fluid sometimes flows around and into the gap between the sensor element and the support fitting portion, and the undercurrent cannot be prevented sufficiently.

SUMMARY OF THE INVENTION

The present invention has been made to solve the above-mentioned problem, and it is therefore an object thereof to provide a flow rate detection device capable of suppressing an undercurrent, which flows around and into a gap between a sensor element and a support fitting portion, to thereby prevent a reduction in flow rate detection accuracy.

In order to achieve the above-mentioned object, a flow rate detection device according to the present invention includes: a sensor element; and a support, in which: the sensor element includes: a cavity which is formed in a rear surface of a plate-shaped semiconductor silicon substrate by removing part of the plate-shaped semiconductor silicon substrate; and a thin film portion which is disposed over the cavity and includes a detecting element; the support includes a fitting portion into which the sensor element is to be disposed; the sensor element is supported to the fitting portion by an adhesive in a floating manner; an anti-undercurrent material is disposed in a gap formed between the sensor element and the fitting portion; and the sensor element has a texture including protrusions and depressions formed on a surface opposed to the fitting portion, and the anti-undercurrent material is brought into contact with the texture.

The flow rate detection device according to the present invention is capable of suppressing the undercurrent, which flows around and into the gap between the sensor element and the support fitting portion, to thereby prevent the reduction in flow rate detection accuracy.

BRIEF DESCRIPTION OF THE DRAWINGS

In the accompanying drawings:

FIGS. 7A and 7B are schematic diagrams illustrating plane directions of precipitation planes before and after the texture formation illustrated in FIGS. 6A to 6C, in which FIG. 7A illustrates the (100) plane and FIG. 7B illustrates the (111) plane;

DETAILED DESCRIPTION OF THE PREFERRED EMBODIMENTS

Figure 1:
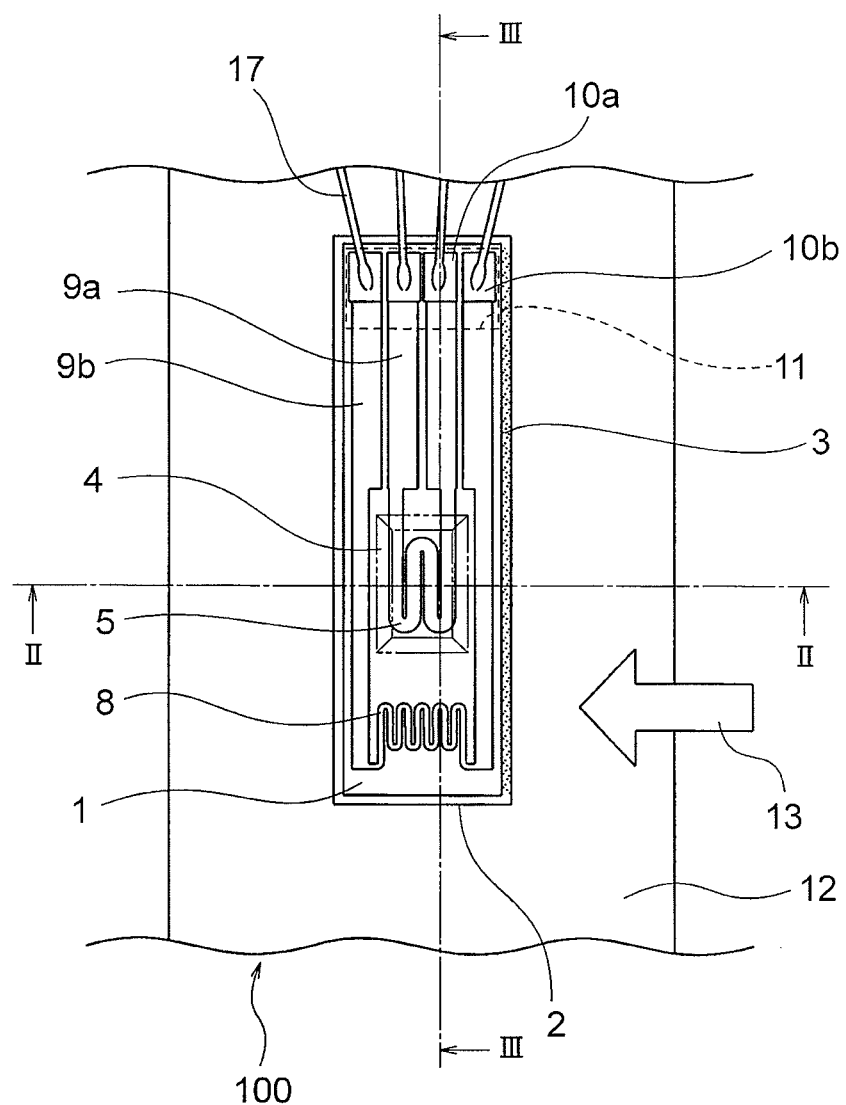
FIG. 1 is a plan view of a support provided with a sensor element according to a first embodiment of the present invention.

Hereinafter, embodiments of a flow rate detection device according to the present invention are described with reference to the accompanying drawings. Note that, in the drawings, like reference symbols denote like or corresponding parts. The flow rate detection device to be described below is applicable as, for example, a device for measuring the volume of air entering an internal combustion engine.

First Embodiment

Figure 2:
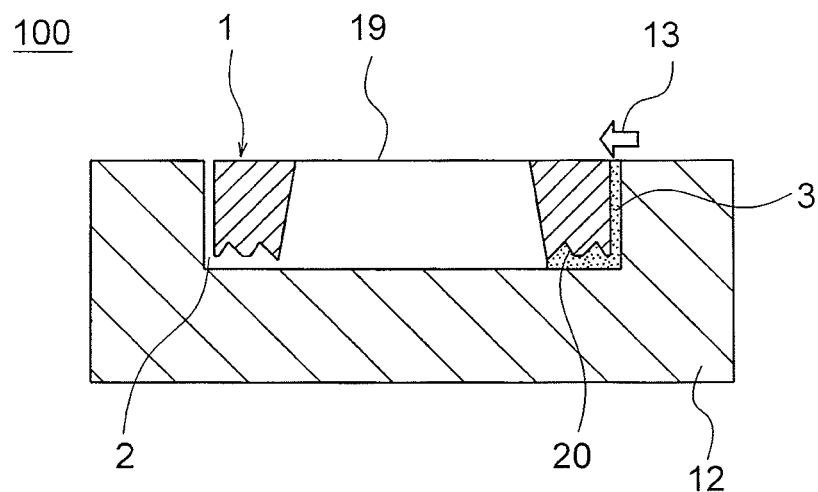
FIG. 2 is a cross-sectional view schematically illustrating a cross section taken along the line II-II of FIG. 1.
Figure 3:
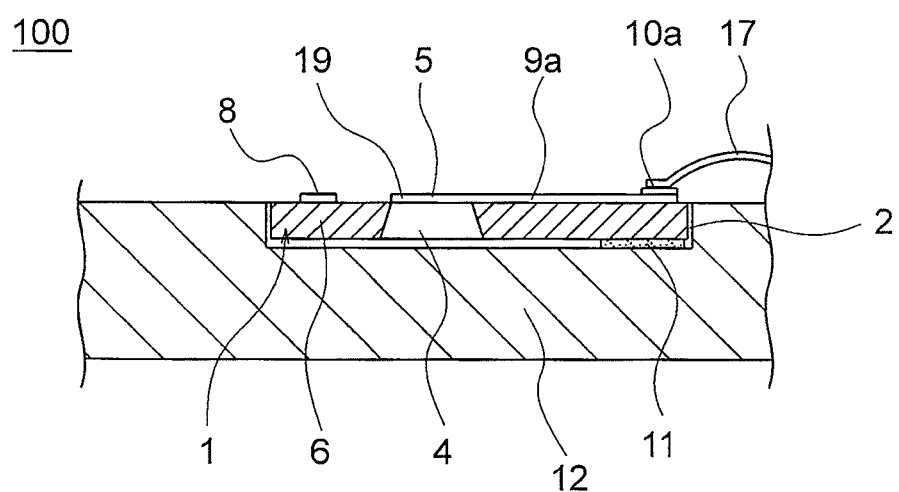
FIG. 3 is a cross-sectional view schematically illustrating a cross section taken along the line III-III of FIG. 1.

Referring to FIGS. 1 to 10C, a structure of a sensor element 1 and a manufacturing process therefor according to a first embodiment of the present invention are described below. FIG. 1 is a plan view of a flow rate detection device 100 according to the first embodiment of the present invention, and FIGS. 2 and 3 illustrate cross-sectional structures thereof cut along the lines II-II and III-III of FIG. 1, respectively.

The flow rate detection device 100 according to the first embodiment includes the sensor element 1 and a support 12. The sensor element 1 includes a cavity 4, which is formed in a rear surface of a plate-shaped semiconductor silicon substrate 6 by removing part of the plate-shaped semiconductor silicon substrate 6, and a thin film portion 19 (heating element 5), which is disposed over the cavity 4 and includes a detecting element. The support 12 includes a fitting portion 2 into which the sensor element 1 is to be disposed and fitted, and is installed in a pipeline through which a fluid to be measured flows. The sensor element 1 is bonded to the support fitting portion 2 by a die-bonding material 11. An anti-undercurrent material 3 is disposed in a gap between the sensor element 1 and the support fitting portion 2 for preventing the fluid to be measured from flowing into the gap, that is, for preventing a so-called undercurrent. Further, the sensor element 1 has a submicron-sized, pyramid (square pyramid) texture 20 provided on a rear surface thereof for preventing seepage of the anti-undercurrent material 3, with the (111) planes of silicon crystals as construction planes.

The respective portions are described in more detail. The structure according to the first embodiment is obtained by cutting the sensor elements 1 provided on the silicon substrate 6 by a cutter or the like to separate one sensor element 1 to another. For example, the flow rate detection device is obtained by dicing a bare silicon wafer having a thickness of 0.5 mm into a size of 12 mm in long side and 3 mm in short side. On the front side of the flow rate detection device 100, the heating element 5 and an intake air temperature detector 8 are formed. The heating element 5 is connected via a lead portion 9a to an electrode 10a for making external electrical connection. The intake air temperature detector 8 is connected via a lead portion 9b to an electrode 10b. As illustrated in FIGS. 1 and 3, the sensor element 1 is bonded to the support fitting portion 2 by the die-bonding material 11.

The die-bonding material 11 is applied in advance onto a bottom surface of the support fitting portion 2, and the application area is an area in contact with the side opposite to the electrodes 10a and 10b of the sensor element 1 (area of the bottom surface of the support fitting portion 2 positioned directly under the electrodes 10a and 10b of the sensor element 1).

Figure 4A:
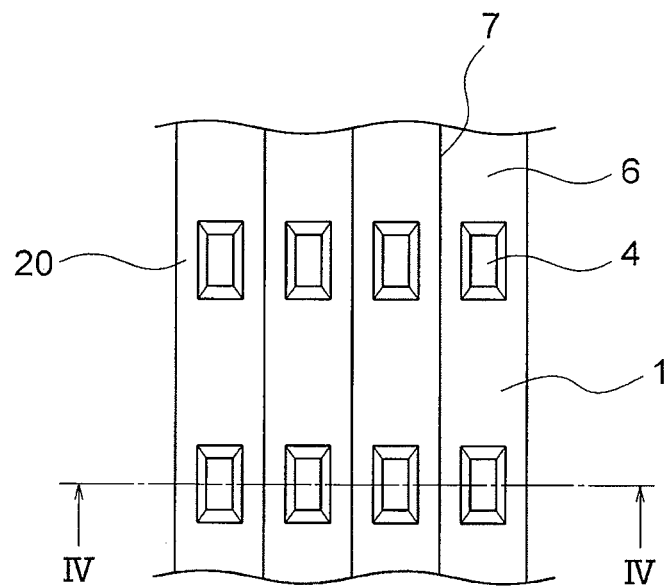
FIG. 4A is a bottom view illustrating the sensor elements before chip dicing from below according to the first embodiment of the present invention.
Figure 4B:
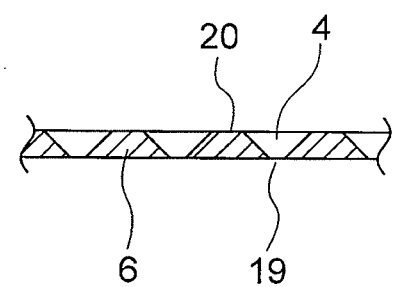
FIG. 4B is a cross-sectional view schematically illustrating a cross section of the sensor elements taken along the line IV-IV of FIG. 4A.

As illustrated in FIGS. 4A and 4B, the sensor elements 1 are obtained by dicing along dicing lines 7 in the last stage of the process to be described later, and the sensor elements 1 each include the cavity 4, which is formed in the rear surface of the plate-shaped semiconductor silicon substrate 6 by removing part of the plate-shaped semiconductor silicon substrate 6, and the thin film portion 19, which is disposed over the cavity 4 and includes the detecting element (thermosensitive resistor for detecting a flow rate of the fluid to be measured). Further, the plate-shaped silicon substrate 6 has the texture 20 functioning as described later on the rear surface thereof, and the texture 20 according to the first embodiment is formed on a contact surface of the sensor element 1 with the fitting portion 2.

Next, the manufacturing process for the sensor element 1 is described with reference to FIGS. 5A to 8. Note that, FIGS. 5A to 5E illustrate the sensor element 1 with the same vertical direction throughout, regardless of vertical directions of the sensor element 1 during individual work processes.

Figure 5A:
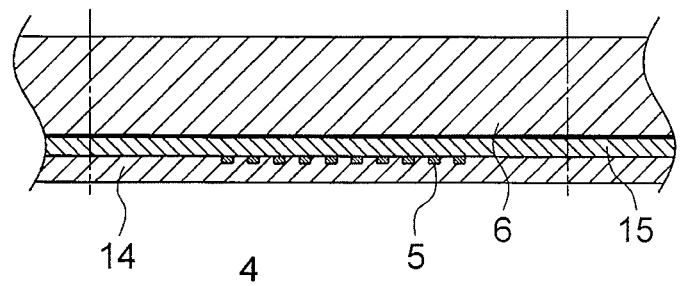
FIGS. 5A to 5E are cross-sectional views schematically illustrating how the sensor elements are processed before and after the chip dicing according to the first embodiment of the present invention.

First, a process until a state illustrated in FIG. 5A is obtained is described. On a front surface of the plate-shaped silicon substrate 6, an insulating support film 15 made of silicon nitride or the like is deposited by sputtering, chemical vapor deposition (CVD), or other similar methods. Subsequently, on the support film 15, the heating element 5 formed of a thermosensitive resistor film such as platinum is deposited by vapor deposition, sputtering, or other similar methods. Then, patterning for constituting a current path of the heating element 5 is performed using photolithography, wet or dry etching, or other similar methods. The intake air temperature detector 8 formed of a thermosensitive resistor film such as platinum is deposited and patterned to be formed in the same manner as that of the heating element 5. Then, an insulating protective film 14 made of silicon nitride or the like is formed over the heating element 5 by sputtering, CVD, or other similar methods, and the thus obtained state is illustrated in FIG. 5A.

Figure 5B:
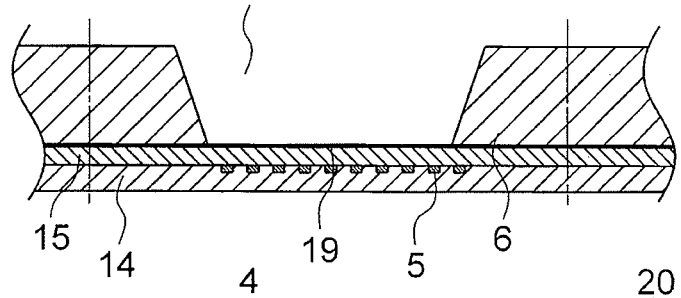

Next, from the state of FIG. 5A in which the support film 15 and the rear surface protective film 14 are laminated on the plate-shaped silicon substrate 6, an etching hole is formed and wet etching is thereafter performed to form the cavity 4 as illustrated in FIG. 5B. The cavity 4 is formed along the sides of the heating element 5.

Figure 5C:
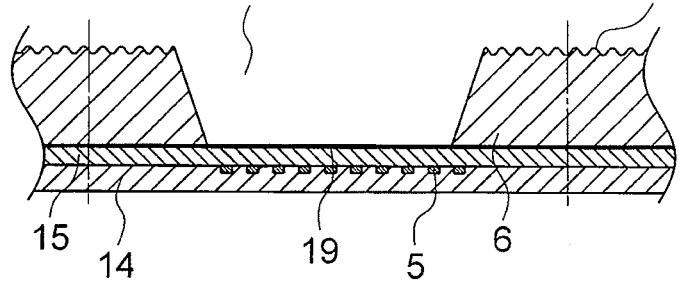
Figure 6A:
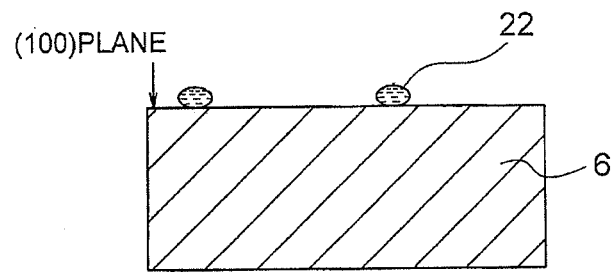
FIGS. 6A to 6C are views illustrating a forming process for a texture according to the first embodiment of the present invention.
Figure 6B:
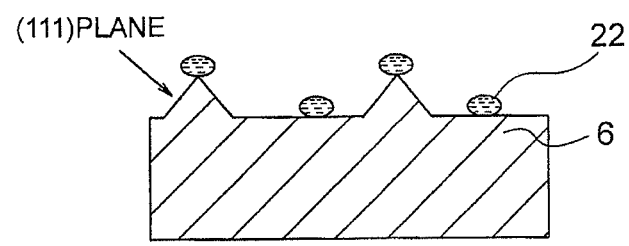
Figure 6C:
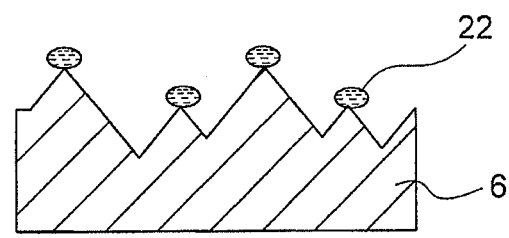
Figure 7A:
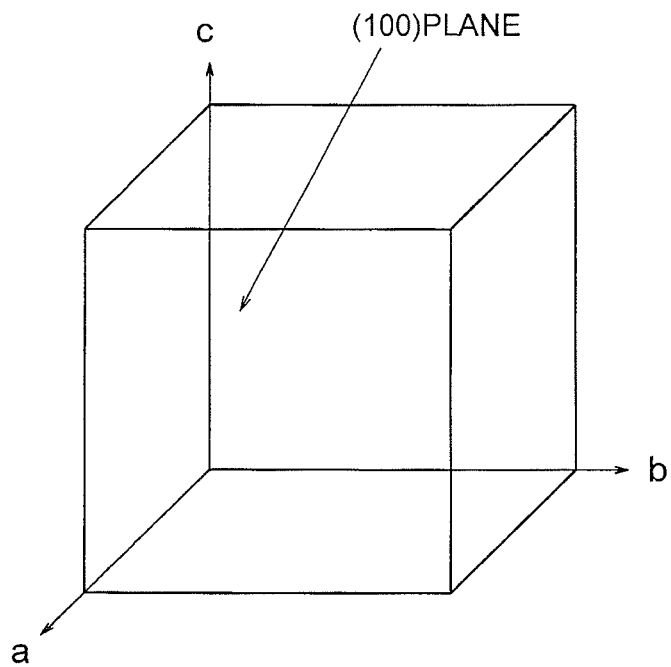
Figure 7B:
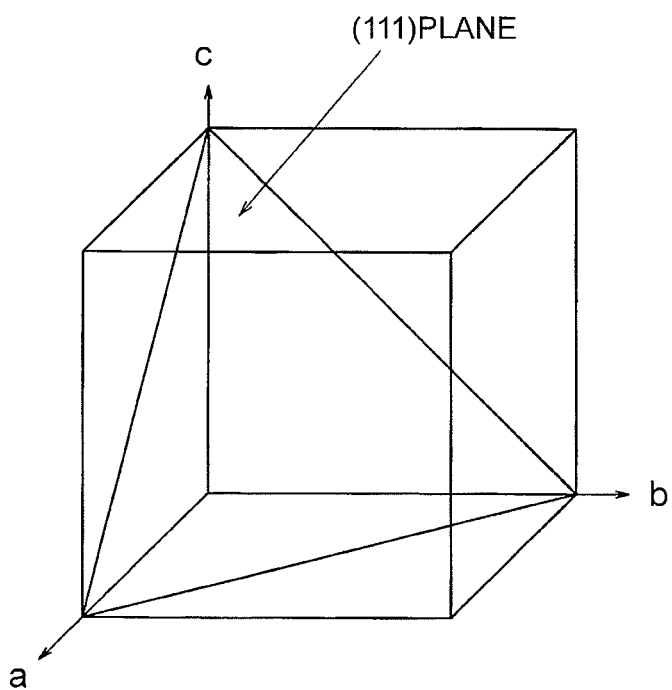
Figure 8:
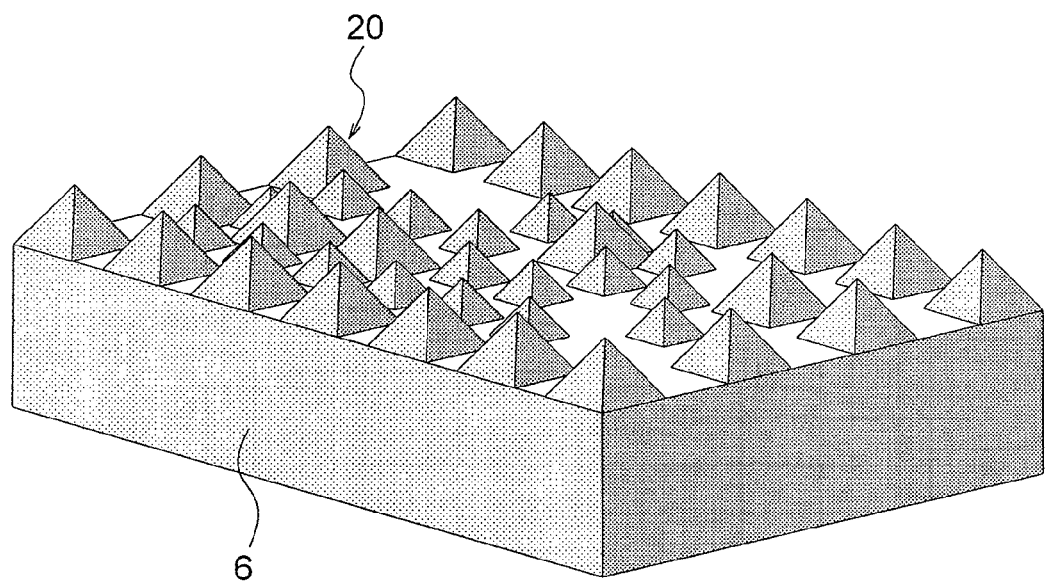
FIG. 8 is a perspective view schematically illustrating the texture.

Next, as illustrated in FIG. 5C, the texture 20 is formed on the silicon substrate 6 in a region around the cavity 4 on the opposite side of the heating element 5 and the like. To give a specific example of forming a texture structure of the texture 20, a heated potassium hydroxide (KOH) aqueous solution or a heated tetramethylammonium hydroxide (TMAH) aqueous solution is added with isopropyl alcohol, followed by immersing the plate-shaped silicon substrate 6 into the thus obtained mixed solution for 10 minutes. This process is described in detail. As illustrated in FIG. 6A, alcohol components 22 are first attached to the silicon substrate 6 in the solution, and the attached alcohol components 22 exhibit effects comparable to etching masks, with the result that the alcohol components 22 allow etching to progress as illustrated in FIG. 6B. Meanwhile, the silicon (100) plane illustrated in FIG. 7A is etched faster while the silicon (111) plane illustrated in FIG. 7B is etched slower, and hence the silicon (111) planes are precipitated at random as illustrated in FIG. 6B. In the course of etching, the alcohol components 22 are further attached to the precipitated silicon (111) planes, thereby forming an uneven structure as illustrated in FIG. 6C with the help of the above-mentioned difference in etching rate. This way, as illustrated in FIG. 8, the uneven structure (texture 20) including the pyramidal protrusions with the (111) planes as the construction planes is formed. The texture 20 is formed on the surface of the sensor element 1 to be brought into contact with the fitting portion 2 when the sensor element 1 is disposed into the fitting portion 2 of the support 12.

Figure 5D:
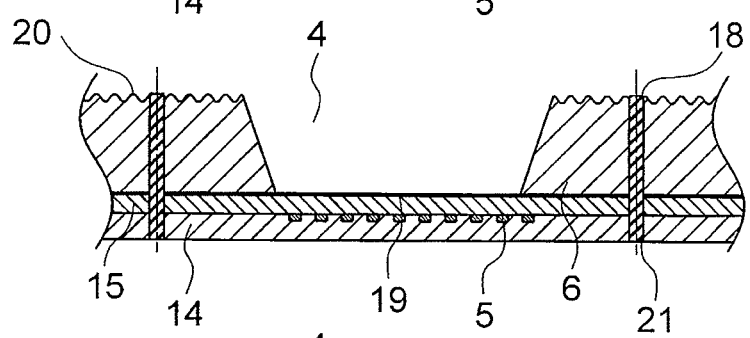
Figure 5E:
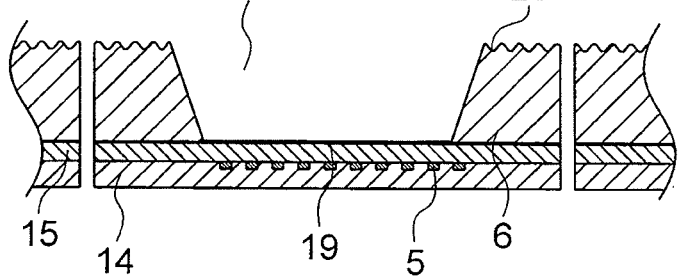

After a plurality of the sensor elements 1 are formed on the plate-shaped silicon substrate 6 in this way, as illustrated in FIG. 5D, dicing regions 18 along boundaries 21 between the sensor elements 1 are cut by a cutter such as a dicing saw, to thereby obtain the individual sensor elements 1 as illustrated in FIG. 5E.

Subsequently, referring to FIGS. 9A to 9C, a structure of the substrate member fitting portion 2 and a process of fitting the sensor element 1 into the substrate member fitting portion 2 according to the first embodiment are described. The substrate member fitting portion 2 has a shape capable of housing the sensor element 1 completely. In other words, the substrate member fitting portion 2 is capable of housing the sensor element 1 so that the sensor element 1 hardly protrudes from an upper surface of the support 12. Further, the texture 20 with the uneven surface is provided at least on the bottom surface of the substrate member fitting portion 2 on the upstream side.

Figure 9A:
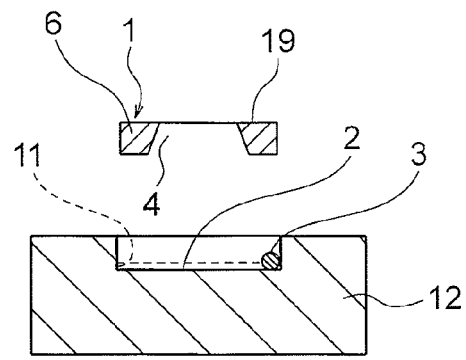
FIGS. 9A to 9C are views schematically illustrating cross sections of the support before and after the sensor element is fitted according to the first embodiment.
Figure 9B:
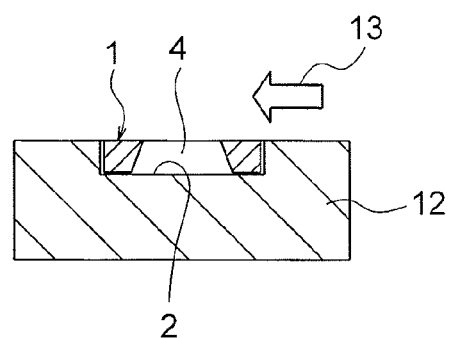

As illustrated in FIG. 9A, the anti-undercurrent material 3 is applied in advance onto the vicinity of the lower part of the side surface (or the vicinity of the part of the bottom surface) of the substrate member fitting portion 2 on the upstream side, and the die-bonding material 11 is applied in advance onto an appropriate area of the bottom surface of the substrate member fitting portion 2 (area corresponding to the area below the electrodes 10a and 10b). After that, the sensor element 1 is fitted into the substrate member fitting portion 2 as illustrated in FIG. 9B. When the sensor element 1 is fitted into the substrate member fitting portion 2, as illustrated in FIG. 9C, the anti-undercurrent material 3 moves as indicated by an arrow 16 through the gap between the sensor element 1 and the substrate member fitting portion 2, resulting in a state in which the anti-undercurrent material 3 is filled to the same height as the front surface of the support 12.

The die-bonding material 11 uses a thermosetting adhesive while the anti-undercurrent material 3 uses a cold setting adhesive. The thermosetting adhesive is easy to manage the degree of curing, and hence the use of thermosetting adhesive for the die-bonding material 11 prevents the process from proceeding to the next step under incomplete adhesion between the sensor element 1 and the support 12. The cold setting adhesive is less likely to spread when cured as compared with the thermosetting adhesive, and hence the use of cold setting adhesive for the anti-undercurrent material 3 prevents the anti-undercurrent material 3 from seeping into the front surface of the sensor element 1 and the cavity 4 when cured.

According to the above-mentioned first embodiment, the anti-undercurrent material is provided as described above to prevent the undercurrent, which causes a reduction in flow rate detection accuracy, in the flow rate detection device having such a floating support structure.

Figure 10A:
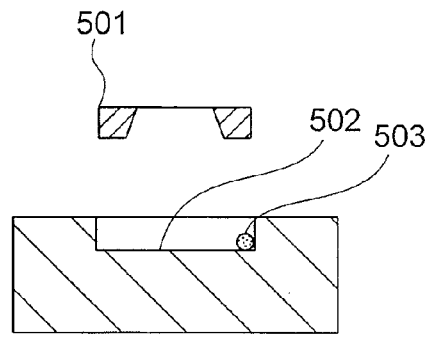
FIGS. 10A to 10C are views illustrating a comparative example relating to a structure in the same mode as that of FIGS. 9A to 9C but not provided with the texture.
Figure 10B:
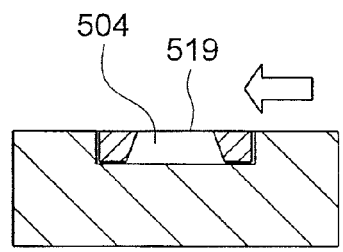
Figure 10C:
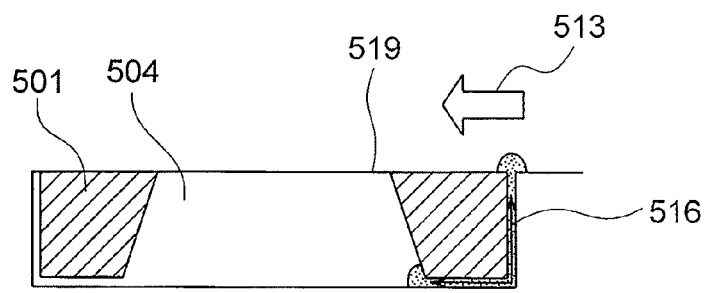

Here, another possible fitting mode simply provided with the anti-undercurrent material is like a comparative example illustrated in FIGS. 10A to 10C. Specifically, as illustrated in FIG. 10A, an anti-undercurrent material 503 is applied onto a side surface of a support fitting portion 502, and then as illustrated in FIG. 10B, a sensor element 501 is fitted into the support fitting portion 502, to thereby fill the anti-undercurrent material 503 into a gap between the sensor element 501 and the support fitting portion 502.

In the above-mentioned comparative example, however, when the sensor element 501 is fitted into the support fitting portion 502, the anti-undercurrent material 503 flows in the directions of arrows 516 as illustrated in FIG. 10C, depending on a variation in applied amount of the anti-undercurrent material 503. Accordingly, there is a fear that the anti-undercurrent material 503 may seep into front and rear surfaces of the sensor element 501. If the anti-undercurrent material 503 seeps into the front surface of the sensor element 501, disturbance occurs in a flow 513 of the fluid to be measured on the front surface of the sensor element 501, causing output fluctuations in the flow rate detection device. On the other hand, if the anti-undercurrent material 503 seeps into a cavity 504 through the rear surface of the sensor element 501, the seeping anti-undercurrent material 503 adheres to a thin film portion 519 including a detecting element, causing a fear of damaging the thin film portion 519.

Figure 9C:
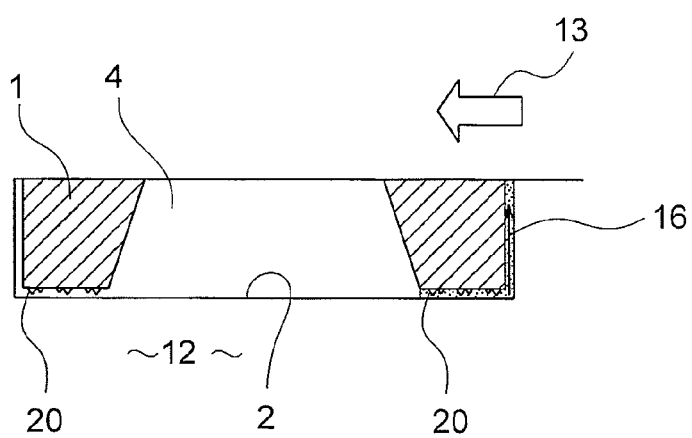

In contrast, according to the present invention, when the sensor element 1 is fitted into the support fitting portion 2, as illustrated in FIG. 9C, the excessive anti-undercurrent material 3 is prevented from seeping into the front surface of the sensor element 1 and the cavity 4, because the texture 20 provides an effect of expanding a surface area of the rear surface of the sensor element 1. Accordingly, no disturbance occurs in the flow 13 of the fluid to be measured on the front surface of the sensor element 1, thereby minimizing the output fluctuations. At the same time, the damage to the thin film portion 19 is also prevented because the excessive anti-undercurrent material 3 does not seep into the cavity 4, either. As described above, the present invention can provide a flow rate detection device high in flow rate detection accuracy and sensitivity.

Because the heights of the protrusions in the texture 20 are controllable, the contact surfaces between the sensor element 1 and the support fitting portion 2 can ensure a certain volume. Further, there is another advantage that the influence of the adhesive thickness is reduced to keep the sensor element 1 in parallel to the support 12 and thereby reduce steps. Besides, the protrusions and depressions may be formed in a self-aligned manner by simply adding a small amount of alcohol into an existing silicon etchant, which leads to high productivity and is easily applicable because of low load on introduction into an existing process.

Meanwhile, if the anti-undercurrent material is not filled to the same height as the front surface of the support, dust deposits on the anti-undercurrent material. Then, a change in dust deposition amount on the anti-undercurrent material changes the flow of the fluid to be measured on the front surface of the sensor element, causing the output fluctuations in the flow rate detection device and leading to a problem of reduced accuracy in flow rate detection.

In contrast, according to the first embodiment, the anti-undercurrent material 3 is filled to the same height as the front surface of the support 12, and hence the above-mentioned dust deposition may be suppressed as much as possible. It is conceivable that a slight step may be provided between the front surface of the sensor element 1 and the front surface of the support 12 due to the thicknesses of the die-bonding material 11 and the anti-undercurrent material 3 on the rear surface of the sensor element 1. Even in such a case, however, the anti-undercurrent material 3 is filled to the same height as the front surface of the support 12 so as to reduce the step, thereby preventing the reduction in flow rate detection accuracy.

Second Embodiment

Figure 11:
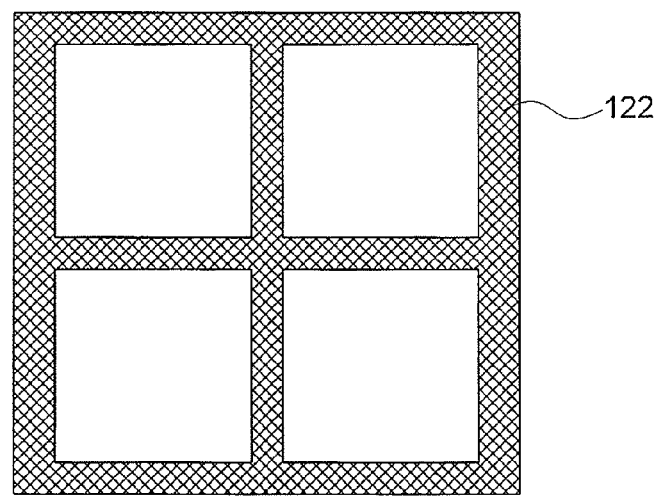
FIG. 11 is an example illustrating a photomask pattern according to a second embodiment of the present invention.
Figure 12A:
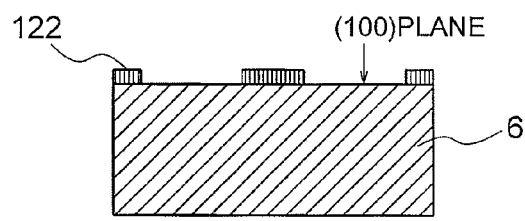
FIGS. 12A to 12C are views illustrating a forming process for an inverted pyramid texture according to the second embodiment of the present invention.
Figure 12B:
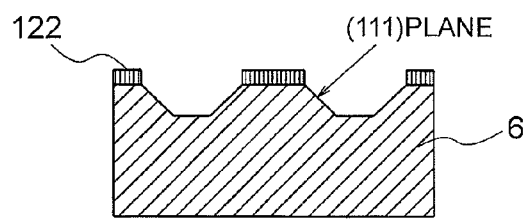
Figure 12C:
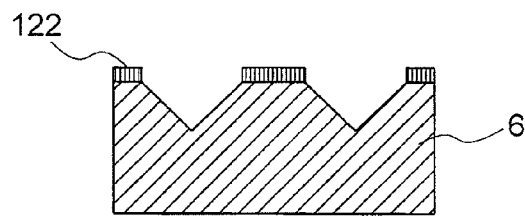
Figure 13:
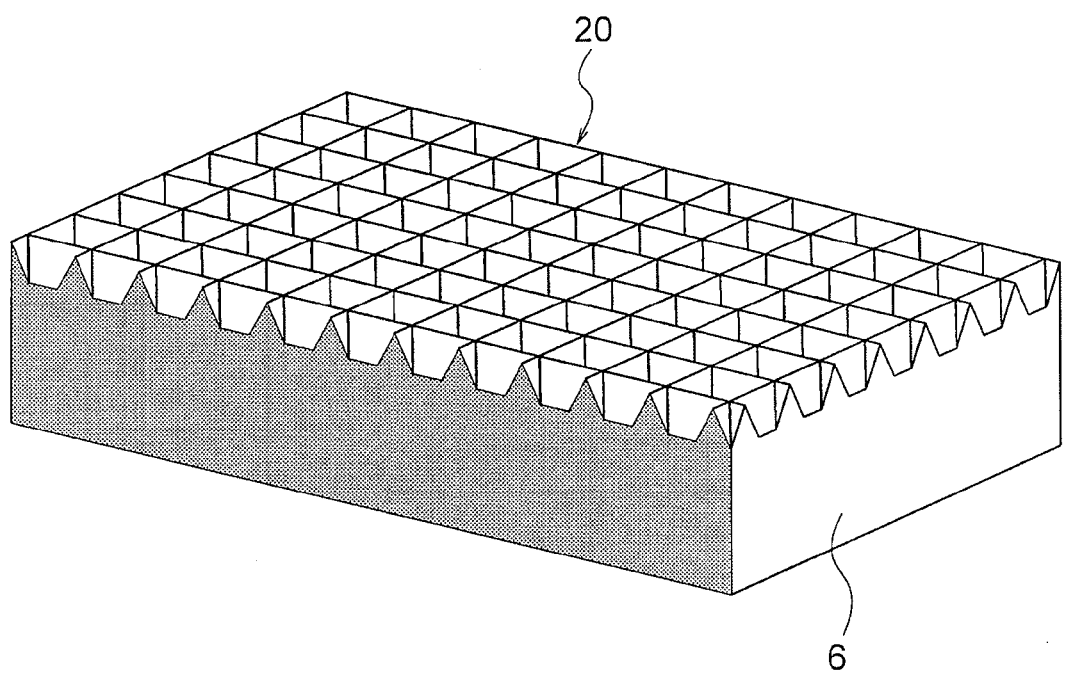
FIG. 13 is a schematic view illustrating the inverted pyramid texture according to the second embodiment of the present invention.

Referring to FIGS. 11 to 13, a second embodiment of the present invention is described. The second embodiment provides an uneven structure in which the square pyramid recesses as the texture of the sensor element 1 according to the first embodiment are arrayed in a regular manner (hereinafter, also referred to as inverted pyramid texture).

In the following, a manufacturing process therefor is described. The same manufacturing process for the sensor element 1 as in the first embodiment is applicable until the cavity 4 is formed in the plate-shaped silicon substrate 6 as illustrated in FIG. 5A. In other words, as illustrated in FIG. 5B, the cavity 4 is formed along the sides of the heating element 5 similarly to the first embodiment.

In the second embodiment, after the formation of the cavity 4 of FIG. 5B, a grid-like oxide film pattern is formed on a rear surface of the silicon wafer by photolithography process or etching using a grid-like photomask pattern 122 having rectangular window openings as illustrated in FIG. 11. Then, the oxide film pattern is used to perform wet etching with a heated potassium hydroxide (KOH) aqueous solution or a heated tetramethylammonium hydroxide (TMAH) aqueous solution, to thereby form the inverted pyramid texture.

FIGS. 12A to 12C illustrate how the wet etching progresses. First, as illustrated in FIG. 12A, the patterned oxide film is provided on the rear surface of the silicon substrate 6. Then, as illustrated in FIG. 12B, the (100) plane as a precipitation plane dissolves into the alkaline solution. After that, as illustrated in FIG. 12B, the (111) planes start to precipitate from the four corners of the square opening portions. As the etching further progresses from the state of FIG. 12B, the (111) planes precipitating from the four corners of the grid line converge together, completing the square pyramid recesses. This way, the texture 20 constituted by the inverted pyramid recesses is formed as illustrated in FIG. 13. The manufacturing process thereafter is the same as in the first embodiment.

According to the second embodiment, similarly to the above-mentioned first embodiment, it is possible to prevent the disturbance in the flow 13 of the fluid to be measured on the front surface of the sensor element 1 and to minimize the output fluctuations. Besides, the second embodiment provides a more uniform texture size and superior dimension controllability, thereby providing a very preferred effect that the characteristics are hardly affected.

Third Embodiment

Figure 14:
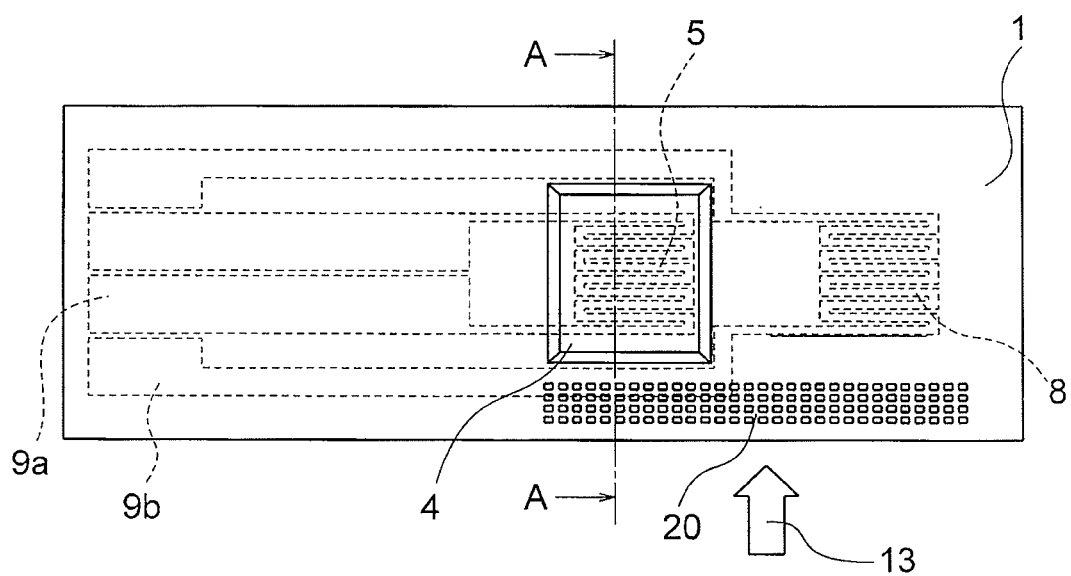
FIG. 14 is a plan view of a flow rate detection device according to a third embodiment of the present invention.

Described as a third embodiment of the present invention are two modes of forming a texture by a dry process, which is used in the semiconductor technology. FIG. 14 is a plan view of a flow rate detection device to be obtained in the third embodiment of the present invention, and FIGS. 15A to 15E and 16A to 16E each illustrate a forming process therefor in cross section viewed in the line A-A of FIG. 14. The flow rate detection device to be obtained in the third embodiment has a structure obtained by cutting the flow rate detection devices provided on the silicon substrate by a cutter or the like to separate one flow rate detection device to another. On the front side of the flow rate detection device, the support film 15 and the protective film 14, which are formed of an insulating material, and the thermosensitive resistor films are formed in a laminated structure. In the rear surface of the flow rate detection device, the cavity 4 having an opening is disposed. The flow rate detection device described in this embodiment is a device marked by a double-sided process, in which the protective film 14 and the support film 15, which are formed of a silicon nitride film or the like, and the thermosensitive resistor films are formed on the front surface side while the cavity 4 is formed on the rear surface side.

As illustrated in FIGS. 14 to 16E, the protrusions and depressions constituting the texture 20 are provided on the upstream side of the vicinity of the opening portion of the cavity 4 provided in the rear surface of the flow rate detection device. The following two methods are exemplified as the modes for providing the protrusions and depressions in that region.

The two methods are briefly described. The first method is a method in which a photoresist or the like is used to form a mask in a region needing the protrusions and depressions in advance, and dry etching processing is performed to obtain a required shape. The second method is as follows. Using sputtering, photolithography, or other similar methods, a metal mask to become a mask material is ensured in advance in the vicinity of a region needing the protrusions and depressions so as to surround the region. Then, the resultant is subjected to a dry etching process so that metal particles of the order of microns emitted from the above-mentioned metal mask are adhered to an opening portion for providing the protrusions and depressions. Then, using the adhered metal particles as micromasking, for example, inductively coupled plasma reactive ion etching (ICP-RIE) is performed for deep etching. Of the above-mentioned techniques, the former is referred to as Dry Process <I> and the latter is referred to as Dry Process <II>, and the detailed description on the methods of forming the protrusions and depressions is made.

Dry Process <I>

FIGS. 15A to 15E illustrate a process flow for providing the projections and depressions on the rear surface of the flow rate detection device. Note that, according to the third embodiment, a 5-inch silicon wafer having a thickness of 500 µm is used to form a plurality of the flow rate detection devices at a time. Here, one of the flow rate detection devices to be formed in the wafer is used for the description referring to the cross-sectional process flow, but other flow rate detection devices in the wafer are formed at a time in a similar manner as illustrated in the cross-sectional process flow.

Figure 15A:
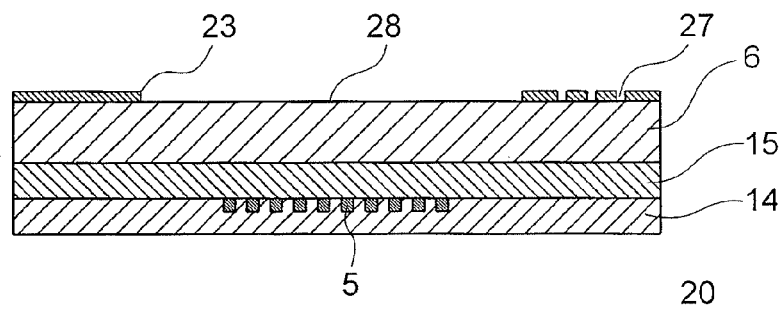
FIGS. 15A to 15E are views relating to the third embodiment, illustrating an example of Dry Process <I>.

First, a process reaching a state of FIG. 15A is described. On the front surface (lower surface in the sheet of FIG. 15A) of the flow rate detection device, that is, on a circuit surface side, the thermosensitive resistor films and the insulating films are formed. The entire resultant surface is covered with a resist mask. Next, on the rear surface (upper surface in the sheet of FIG. 15A) of the flow rate detection device, a silicon oxide film 23 having a thickness of 500 nm, for example, is formed by photo-enhanced chemical vapor deposition (PE-CVD). The surface of the silicon oxide film 23 is sequentially subjected to resist application and photolithography, and is processed by a wet process with buffered hydrogen fluoride or the like. The unnecessary resist masks on both sides of the flow rate detection device are removed by processing in a plasma asher or the like, with the result that opening portions 27 for forming the protrusions and depressions and an opening 28 for proving the cavity 4 by anisotropic etching are formed at the same time in the rear surface of the flow rate detection device. According to the third embodiment, the plurality of opening portions 27 measuring 50 µm per side are provided in a region in which the texture 20 illustrated in FIG. 14 is to be provided. The opening portions 27 are designed to have an interval of 150 µm therebetween.

Figure 15B:
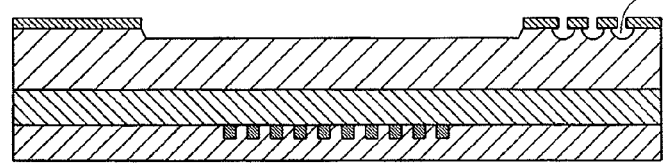

Next, processing for obtaining a state of FIG. 15B is described. With silicon exposed in the opening portions 27 for providing the protrusions and depressions, isotropic dry etching with a mixed gas of, for example, tetrafluoromethane (CF4) and oxygen is performed to obtain semi-circular shapes in cross section. Note that, as illustrated in FIG. 15B, the etching similarly progresses in the cavity forming region as well.

Figure 15C:
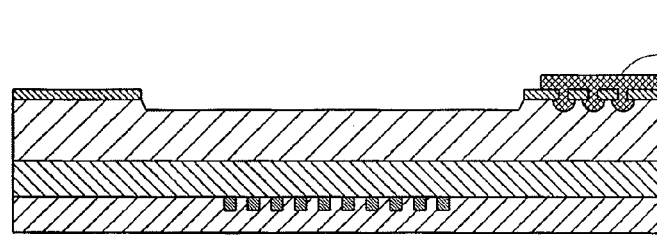

Next, as illustrated in FIG. 15C, photolithography or the like is used to cover the above-mentioned etched opening portions 27 and their vicinities by a resist 24 as a mask layer.

Figure 15D:
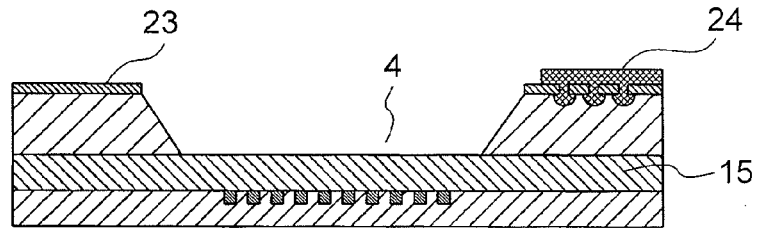

Meanwhile, a bath filled with a tetramethylammonium hydroxide (TMAH) aqueous solution or the like is heated at, for example, 80° C. and after a set temperature is reached, the silicon wafer provided with the flow rate detection devices is immersed in the solution. Then, while agitating the solution with an agitator or the like, the silicon wafer is subjected to anisotropic etching of silicon under temperature control and liquid circulation, to thereby obtain a state illustrated in FIG. 15D. In the anisotropic etching, the support film 15 functions as an etch stop film and the flow rate detection device having the cross-sectional structure illustrated in FIG. 15D is thus formed.

Figure 15E:
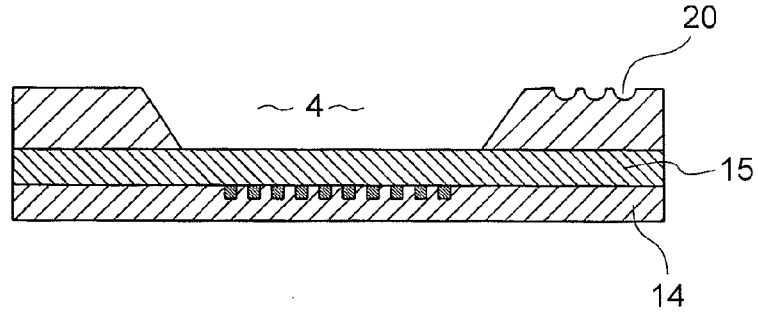

As illustrated in FIG. 15E, the resist 24, which has been provided to complete the state of FIG. 15C, is subjected to resist ashing using a technique such as plasma ashing, and the entire front surface is protected by a resist mask or the like, followed by immersing the flow rate detection device into a bath filled with a chemical solution of buffered hydrogen fluoride (BHF), to thereby remove the silicon oxide film 23 remaining on the rear surface. Through a series of those steps, the flow rate detection device provided with the protrusions and depressions on the rear surface side is obtained, which are necessary in the third embodiment.

Note that, in the above description, an oxide film by PE-CVD is used on the rear surface side of the flow rate detection device, but the present invention is not limited thereto and an oxide film as used herein may be selected from materials excellent in chemical resistance against such an alkaline solution as a TMAH aqueous solution. For example, a similar oxide film such as a spin-on glass (SOG) film or a thermal oxide film may be used to obtain the same function. Other available methods than PE-CVD for forming the oxide film are low-pressure CVD, atmospheric pressure CVD, sputtering with an oxide film as a target, and reactive sputtering on a silicon target with an oxygen gas. Other available materials than an oxide film are a resist mask and a polyimide material in the case of organic material and a silicon oxynitride (SION) film in the case of inorganic material. The necessary film thickness may be any value as long as the chemical resistance function is ensured. Further, a wet process is used for etching an oxide film, but physical etching such as ion milling may be used to obtain the same effect.

Another example of isotropic etching for the opening portions for forming protrusions and depressions, which are provided using an oxide film as a mask, is chemical etching with a xenon difluoride ($XeF_2$) gas or the like. In this case, semi-circular shapes in cross section are also obtained, and there is no damage to the resist because plasma is not used, providing an advantage that resist residues are less likely to remain on the front surface of the oxide film. Further, a gas to be used for isotropic etching may be a mixed gas of sulfur hexafluoride ($SF_6$) and oxygen. Still further, any gas may be used as long as the illustrated cross-sectional shape is obtained without any damage to an exposed part of silicon and an oxide film.

In the structure described above, the size of the opening portions for providing protrusions and depressions is 100 μm square, but the above description has no intention of limiting the size thereof. As the patterned shape, any other shapes than a square shape, such as a circular shape, may be provided. Note that, because the opening portions are subjected to isotropic etching, the respective opening portions need to be provided with a sufficient interval therebetween.

Further, the resist mask is used for protecting the opening portions after isotropic etching, but another mask material such as polyimide may be used. Still further, the TMAH aqueous solution is used for anisotropic etching of silicon, but for example, a potassium hydroxide (KOH) solution may be selected as another etchant to obtain the same shape. The temperature in the bath is also not limited to the above, but it is desired that processing be performed at a high temperature of about 80° C. in order to expect the improvement in etching rate. Further, the process reaching the state of FIG. 15E has been exemplified as a resist removing process by plasma ashing, but the process may use wet chemical etching with a resist stripper or the like. Still further, using ashing and a resist stripper process in combination may reduce the influence of residues and the like.

Next, another example relating to Dry Process <I> is described with reference to FIGS. 16A to 16E. First, similarly to FIGS. 15A to 15E, on the rear surface side of the flow rate detection device, using an oxide film, photolithography and dry etching are used in addition to the opening portion to sequentially perform silicon oxide film mask formation and opening processing, to thereby obtain a state of FIG. 16A. In this stage, silicon is exposed in the region to become the cavity 4 and in the opening portions 27 for forming protrusions and depressions. The resist masks are applied onto both surfaces of the wafer, and the resist on the side of the opening portions for forming protrusions and depressions is removed by an etcher or the like after the opening is provided. Note that, the resist on the front surface side of the flow rate detection device is left as it is.

Figure 16A:
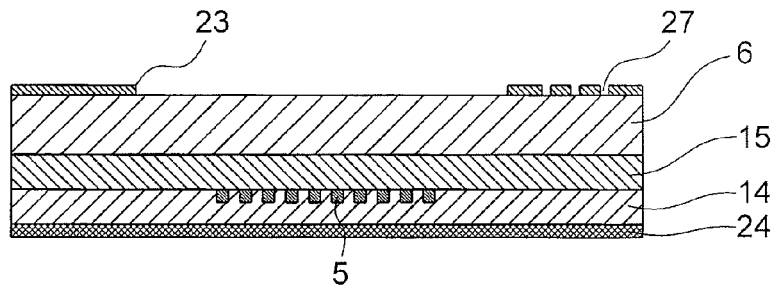
FIGS. 16A to 16E are views relating to the third embodiment, illustrating another example of Dry Process <I>.
Figure 16B:
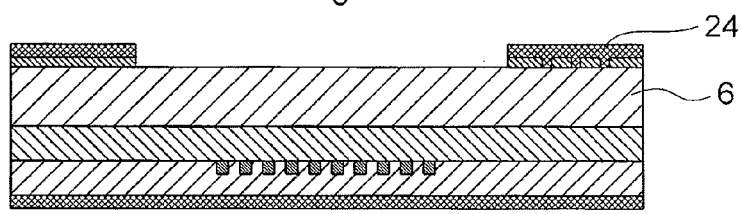
Figure 16C:
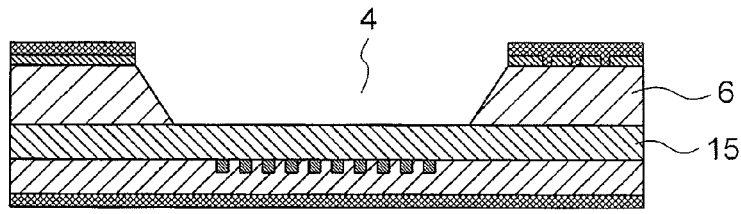
Figure 16D:
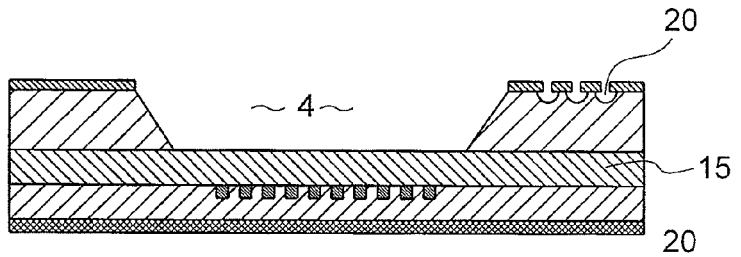
Figure 16E:
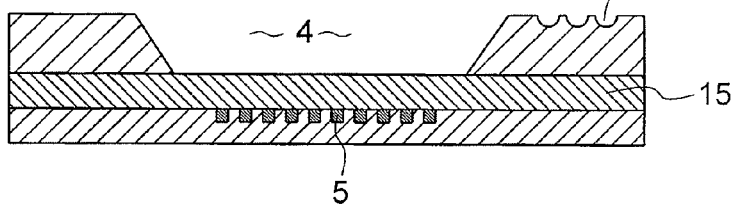

Next, as illustrated in FIG. 16B, the entire wafer surface including the opening portions for forming the protrusions and depressions on the front surface side of the flow rate detection device is covered with a resist mask by photolithography or the like. Then, the silicon wafer in which the flow rate detection devices are to be formed is immersed into a bath filled with a TMAH aqueous solution heated at 80° C. to be subjected to anisotropic etching, thereby obtaining a cavity having an inverted trapezoidal shape in cross section as the cavity 4 as illustrated in FIG. 16C. Also in this step, the support film 15 serves as an etching stopper.

After the formation of the cavity 4, the resist mask on the opening portions for protrusions and depressions is removed by resist ashing to expose silicon. The entire surface on the front side is covered with the resist mask, and then isotropic dry etching with a mixed gas of tetrafluoromethane (CF4) and oxygen is performed to obtain a state illustrated in FIG. 16D. Note that, at this time, etching on the silicon surface constituting the side wall of the inverted trapezoid progresses in the manner that the entire side wall is uniformly recessed (etching progresses to the deep side). Due to this dry etching processing, the distal end of the oxide film provided on the rear surface of the flow rate detection device has an eaves shape so that the volume of the cavity is increased, which is different in structure from the process described with reference to FIGS. 15A to 15E. Further, the support film exposed in the cavity is reduced in thickness from the initial thickness because of dry etching. Finally, the unnecessary silicon oxide film is removed by a wet process using buffered hydrogen fluoride or the like, and then the resist mask provided on the front surface side of the flow rate detection device is removed by plasma ashing or the like, to obtain a state illustrated in FIG. 16E so that the desired flow rate detection device is obtained.

According to the flow rate detection device obtained in the steps described above, the protrusions and depressions are formed after the formation of the cavity in the manner that the entire oxide film on the rear side is covered with the resist, and hence it is possible to cover scratches and the like which are generated in the course of the processing on the front surface of the flow rate detection device, for example, thereby inhibiting anisotropic etching from progressing from the scratches.

Note that, in FIGS. 16A to 16E, the resist mask for the purpose of protecting the front surface of the flow rate detection device is left until the final step. The resist mask is accordingly damaged by plasma and the TMAH aqueous solution, and hence it is more preferred that the resist be removed using a resist stripper in combination with a normal plasma asher.

Dry Process <II>

A second mode of the third embodiment has a feature in that ICP-RIE is used to form densely-packed columnar needles in the unevenness region with the used of micromasking. FIGS. 17A to 17D illustrate a process flow therefor.

Figure 17A:
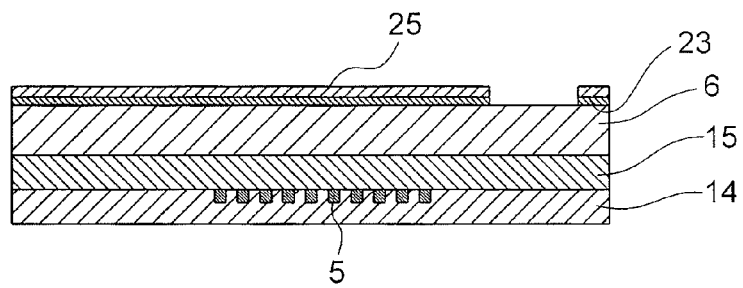
FIGS. 17A to 17D are views relating to the third embodiment, illustrating an example of Dry Process <II>.

A step reaching a state of FIG. 17A is described. On the rear surface (upper surface of sheet of FIG. 17A) of the flow rate detection device, the silicon oxide film 23 having a thickness of 500 nm and a metal mask 25 made of aluminum having a thickness of 500 nm, for example, are formed in a laminated structure. Each of those films is formed by sputtering, and a resist mask is provided on the front surface side for protection. The laminated structure provided on the rear surface side by sputtering is covered with a resist mask by photolithography in an entire region excluding an opening portion for providing protrusions and depressions. Next, in an aluminum etchant bath, a silicon wafer in which the flow rate detection devices are provided is immersed to remove unnecessary aluminum, and subjected to washing with water and drying by a spindle, followed by immersing the silicon wafer into a bath filled with buffered hydrogen fluoride, to thereby remove the oxide film remaining in the opening portion. Through the above-mentioned step, as illustrated in FIG. 17A, the mask formation for the opening portion, in which the protrusions and depressions are to be formed, is completed.

Figure 17B:
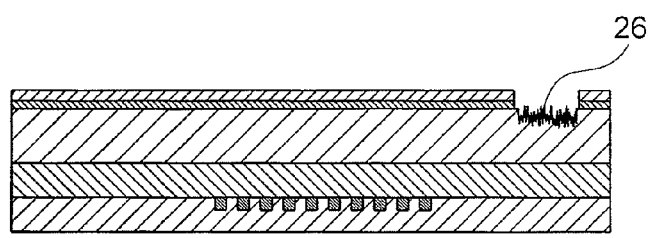
Figure 17C:
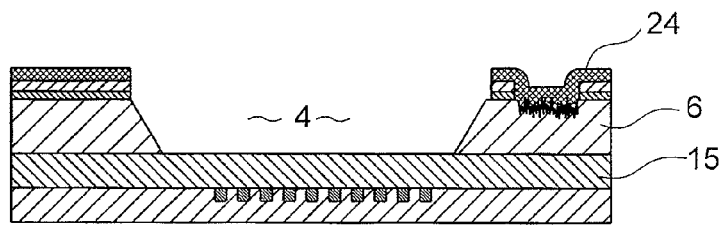

Next, ICP-RIE is used to perform pulse-etching processing, and a state of FIG. 17B is obtained. An ICP-RIE apparatus is an apparatus for deep etching employing an inductively coupled method as the discharge form. This apparatus is capable of obtaining a shape with a large aspect ratio at a high etching rate as compared with normal reactive ion etching (RIE), with superior selectivity and anisotropy. Further, etching is performed by the Bosch process, in which deposition and etching processes are repeated to form a groove (depression) with a large aspect ratio while protecting the etching side walls. As etchant gases to be used, a $C_4F_8$ gas and a sulfur hexafluoride ($SF_6$) gas are alternately switched and supplied into a chamber. The $C_4F_8$ gas is used in the deposition process, and a substance such as Teflon (registered trademark) is deposited through plasma polymerization, thereby preventing the side walls of the depressions. In the etching process with the $SF_6$ gas, polymers on the bottom surface of the depressions as a result of the deposition are etched to expose the silicon surfaces. The silicon is repeatedly etched with fluorine radicals for a necessary number of times, enabling the etching process reaching to a desired depth. Note that, in this etching, a silicon oxide film or a resist is generally used as a mask material. For example, when a mask material made of aluminum is used for the mask for processing, the micron-sized particles emitted from the mask material are scattered. In ICP-RIE, aluminum is not etched and the scattered particles are left as they are. Those metal particles are used as micromasking so that needle-like or columnar protrusions 26 having a high aspect ratio are provided in the opening portion for protrusions and depressions.

Figure 17D:
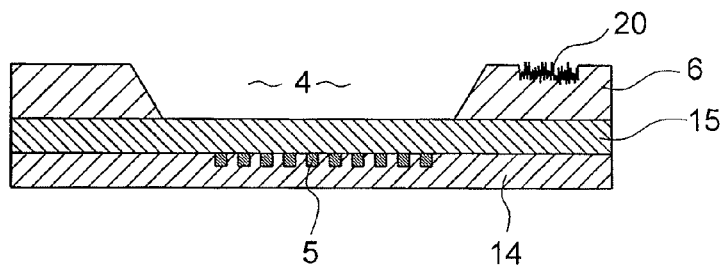

Next, the periphery of the region in which the cavity 4 is to be formed, that is the opening portion for protrusions and depressions and its vicinity are covered with a resist 24 as a mask layer. Then, aluminum and the silicon oxide film in the region for providing the cavity 4 in the rear surface of the flow rate detection device are removed by an etchant. Next, in a bath filled with a TMAH aqueous solution heated to 80° C., the silicon substrate 6 provided with the flow rate detection device is immersed to perform anisotropic etching and form the cavity 4, thereby obtaining a state of FIG. 17C. Finally, the resist 24 is removed by plasma asking or a resist stripper, and thereafter, the unnecessary mask material made of the oxide film and aluminum are removed to obtain the flow rate detection device in which the texture 20 with the protrusions and depressions and the cavity 4 are formed as illustrated in FIG. 17D.

Note that, according to the present invention, aluminum is used on the silicon oxide film by sputtering, but another metal material than aluminum may be used and the film thickness is not particularly limited to 500 nm. Further, a silicon oxide film is used as a mask material, but the protrusions and depressions may be formed only by aluminum without the silicon oxide film. Still further, wet etching is employed for etching the silicon oxide film and the aluminum material, but dry etching such as ion milling may be used for opening processing. According to the present invention, the columnar needles with a high aspect ratio are provided in the opening portion for protrusions and depressions, and hence the permeability of the anti-undercurrent material is enhanced to increase the surface area, resulting in good affinity.

According to the third embodiment, in addition to the effects obtained in the second embodiment, the positional selectively is allowed for the formation of protrusions and depressions, and isotropic etching may be performed in Dry Process <I> in particular, which makes it possible to ensure a certain volume between the contact surfaces of the sensor element 1 and the support fitting portion 2.

The details of the present invention have been specifically described above referring to the preferred embodiments, but it should be understood by a person skilled in the art that various modified modes may be adopted based on the basic technical concept and the teaching of the present invention.

For example, in the above-mentioned first to third embodiments, the anti-undercurrent material is exemplified as being filled in the flat rectangular sensor element 1 mainly in the region constituting one side on the upstream side of the fluid to be measured. However, the present invention is not limited to thereto. Accordingly, the anti-undercurrent material of the present invention only needs to be disposed in a manner that a region in which the anti-undercurrent material is not filled is provided on at least a part of the downstream side of the sensor element. For example, the anti-undercurrent material may be provided in a manner that a "U-shaped" region including the upstream side and both lateral sides of the fluid is a filled region. Further, the sensor element and the gap between the sensor element and the support are not limited to the rectangular shape and rectangular ring shape, respectively.

What is claimed is:

1. A flow rate detection device, comprising:
    a sensor element; and
    a support,
    wherein the sensor element comprises:
        a cavity which is formed in a rear surface of a plate-shaped semiconductor silicon substrate by removing part of the plate-shaped semiconductor silicon substrate; and
        a thin film portion which is disposed over the cavity and includes a detecting element,
    wherein the support comprises a fitting portion into which the sensor element is to be disposed,
    wherein the sensor element is supported to the fitting portion by an adhesive in a floating manner, wherein an anti-undercurrent material is disposed in a gap formed between the sensor element and the fitting portion, in which the anti-undercurrent material is filled into the gap to the same height as a front surface of the support, and wherein the sensor element has a texture including protrusions and depressions formed on a surface opposed to the fitting portion, and the anti-undercurrent material is brought into contact with the texture.

2. A flow rate detection device according to claim 1, wherein the texture is formed using wet etching.

3. A flow rate detection device according to claim 2, wherein the wet etching for forming the texture uses a mask including rectangular window openings.

4. A flow rate detection device according to claim 2, wherein the wet etching uses an alkaline etchant having alcohol added therein.

5. A flow rate detection device according to claim 1, wherein the texture is formed by using dry etching with a mask formed in advance.

6. A flow rate detection device according to claim 5, wherein the texture is formed by, after a mask material is disposed in advance in a vicinity of a region needing the protrusions and depressions so as to surround the region, using dry etching so that micromasking emitted from the mask material is formed simultaneously with etching.

7. A flow rate detection device according to claim 1, wherein the texture is provided on a rear surface of the flow rate detection device in a vicinity of an opening portion of the cavity on an upstream side.

8. A flow rate detection device according to claim 1, wherein the anti-undercurrent material comprises a cold setting adhesive.

* * * * *